May 14, 1946. H. W. MORGAN 2,400,248
MOTOR MOUNTING
Filed Dec. 4, 1944
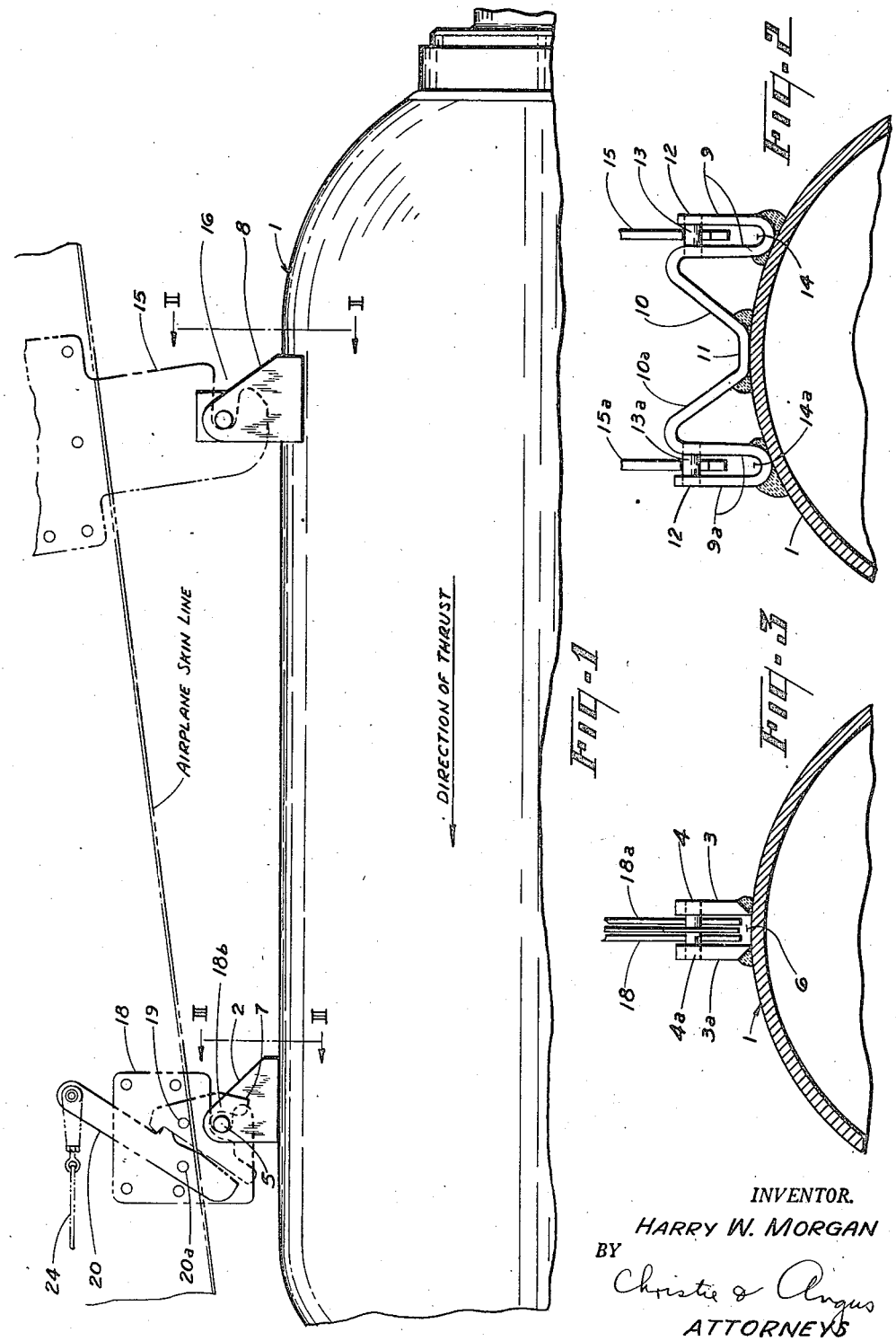
INVENTOR.
HARRY W. MORGAN
BY
Christie & Angus
ATTORNEYS Patented May 14, 1946

2,400,248

UNITED STATES PATENT OFFICE 2,400,248

MOTOR MOUNTING

Harry W. Morgan, Pasadena, Calif., assignor to Aerojet Engineering Corporation, Azusa, Calif., a corporation of Delaware Application December 4, 1944, Serial No. 566,410

2 Claims. (Cl. 248—5)

This invention relates to means for attaching objects to aircraft and more particularly to means for attaching rocket motors to aircraft.

The principal object of this invention is to provide attaching means which will securely attach the object, such as a rocket motor, to an aircraft in a secure manner and without undesirable swaying of the object on its supports.

It has heretofore been known to suspend or attach objects such as bombs and the like to an aircraft, and the supporting means have commonly comprised a single or two-point suspension. For example, a pair of hooks, one fore and one aft, would be attached to the fuselage of the aircraft and corresponding lugs would be attached to the bomb, so that the bomb would be hung from the hooks. In such an arrangement, when it is desired to drop the bomb, the hooks are disengaged from the lugs. By the use of such attaching means the bomb or object tends to sway sideways on its supports. In order to check the undesired swaying motion it has been common to provide additional side supports or sway brackets having arms held against the sides of the bomb to stop it from swaying.

When the object attached to the aircraft is a rocket motor the swaying motion and other looseness inherent in such a type of support is objectionable, both from the standpoint of swaying and also from the standpoint of the high thrust of the rocket motor against the supports. In accordance with my present invention I have provided an attaching arrangement which avoids the objections of the above-mentioned prior supporting means, and my supports are capable both of taking the high thrust and preventing swaying of the rocket motor.

My supporting arrangement comprises a three-point suspension connected to the aircraft, for example, to the fuselage or to the underside of the wings. This suspension arrangement comprises a lug located at the forward end of the rocket motor and a pair of lugs somewhat separated from each other at the rear end of the rocket motor. The arrangement and location of these lugs is such that they match corresponding hooks provided for them in the airplane fuselage or structure. One or more of these hooks may be provided with a locking and releasing means.

My invention will be more readily understood by reference to the following description and drawing in which:

Fig. 1 is a side elevational view of a rocket motor showing the relationship of the lugs;

Fig. 2 is a partial elevational view of the rocket motor; showing the forward lug as mounted on the motor;

Fig. 3 is a partial sectional view of the rocket motor showing the aft lug as mounted on the motor.

Similar numerals refer to similar parts throughout the views.

A rocket motor 1 comprising a combustion chamber, which contains a propellant and a restricted throat nozzle, has welded to the exterior of the combustion chamber near its forward end, and on its lateral center line, a suspension hook 2 which consists of two vertical side portions 3 and 3a with holes 4 and 4a to receive pin 5 in such a manner that a space 6 is provided between the combustion chamber wall and vertical side portions and the pin to receive a retractable trigger 7 as provided in any standard bomb rack, and forming a portion of the airplane structure. The pin 5 is furnace brazed or welded into the holes 4. There is provided at the rear or nozzle end of the rocket motor a bracket 8 welded to the motor combustion chamber and formed in such a manner that two sets of spaced vertical side walls 9 and 9a are formed integral with two canted inner portions 10 and 10a terminating at the center of the bracket with a flat portion 11. Sidewalls 9 and 9a are provided with holes 12 which receive pins 13 and 13a in such a manner that the spaces 14 and 14a are spanned forming a hook receiving thrust member. The pins 13 and 13a are furnace brazed or welded into the holes 12 and 12a. The spaces 14 and 14a between the vertical walls 9 and 9a are so placed as to receive hooks 15 and 15a which are part of the airplane structure.

The trigger 7 is fastened to the airplane structure by two plates 18 and 18a between which it is pivotally held by a pin 19. Plates 18 and 18a are rigidly fastened to the airplane structure and terminate in slots 18b for receiving pin 5. A trigger locking lever 20 is pivoted between the plates by a pin 20a and is held in locking engagement with the trigger by a spring (not shown).

The invention operates in the following manner: When attaching the rocket motor to an airplane the motor is lifted in such a manner that the two rear shear pins 13 and 13a are passed into hooked-shaped slots in the rear hooks 15 and 15a. The forward end of the rocket motor is then lifted to a height whereby the forward pin 5 is engaged by the bomb rack trigger 7 which is then locked about pin 5 and is releasable by the airplane pilot. When the rocket is fired the two rear pins receive the full thrust of the rocket and transmit the thrust through the hooks 15 and 15a into the airplane structure. Any side swaying of the rocket due to the airplane performance is limited by the sidewalls 9 and 9a and transmitted to the canted portions 10 and 10a. When the rocket's power has been exhausted the lever 20, actuated by the pilot through a cable or other means 22, releases the trigger 7 and presses the pin 5 out of engagement with slots 18b causing the empty rocket motor to fall away from the airplane.

It will be seen that I have provided simple means for attaching a rocket motor or the like to the exterior of the airplane in such a manner that connecting the rocket is a very simple operation; that the means provided are strong enough in all directions so as to receive and deliver thrust and side loads into the airplane structure and that the dispension of the rocket when fired is easily accomplished.

I claim:

1. Means for fastening a rocket motor to an aircraft, comprising a strip attached to the outer shell of the motor, said strip being shaped to provide two pairs of spaced walls laterally separated from each other, and a pin supported across the space between the walls of each of said pairs of spaced walls, and a third pair of spaced walls fastened to the shell rearward of said strip, and on a longitudinal line running centrally through said strip, and a supporting pin supported across the space between the walls of said third pair of spaced walls, said pins being adapted to be supported by corresponding fastening devices on the aircraft.

2. Means for fastening a rocket motor to an aircraft, comprising a strip attached to the outer shell of the motor, said strip being shaped to provide two pairs of U-shaped walls extending parallel with each other and upwardly from the motor, the walls of each pair being spaced by an amount sufficient to receive a fastening device and having a pin across the space, the strip being fastened to the motor at the base of each U and also between the two U's, and another fastening member fastened to the shell rearwardly of said strip and on a longitudinal line running along the motor centrally through said strip.

HARRY W. MORGAN.